Figure 1:
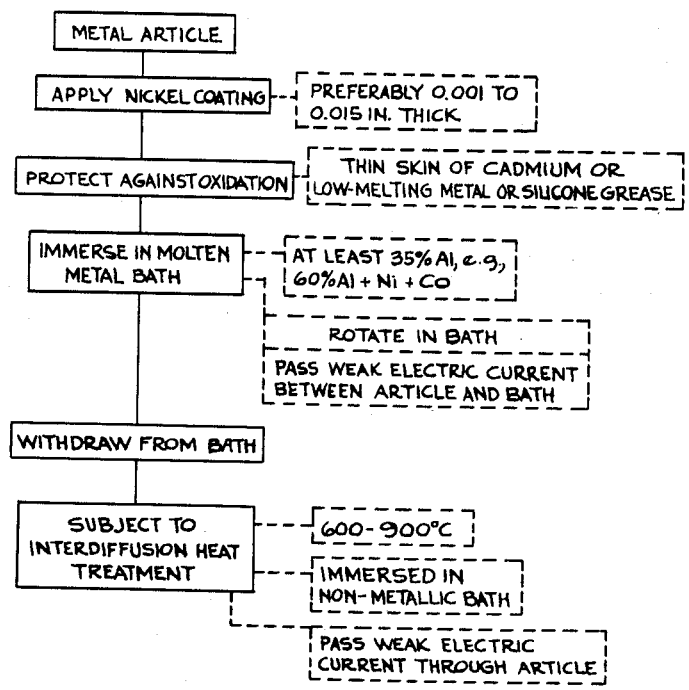

Jan. 5, 1954   R. GRAHAM   2,664,873
COATED METAL PRODUCT AND METHOD OF PRODUCING SAME
Filed Aug. 1, 1947

Inventor: Robert Graham
By Oswald N. Milmore
His Attorney

Patented Jan. 5, 1954

2,664,873

UNITED STATES PATENT OFFICE 2,664,873

COATED METAL PRODUCT AND METHOD OF PRODUCING SAME

Robert Graham, Kilmarnock, Scotland, assignor to Shell Development Company, San Francisco, Calif., a corporation of Delaware Application August 1, 1947, Serial No. 765,648

Claims priority, application Great Britain August 9, 1946

20 Claims. (Cl. 123—188)

The present invention relates to metal products having surface coatings which will prevent or inhibit oxidation and other decomposition, such as will occur at high temperatures, and with an improved process for coating or alloying metal surfaces with an aluminum alloy to apply such a coating. In one of its specific embodiments the invention pertains to a process for coating valves, particularly valves for internal combustion engines, with an aluminum alloy, thereby forming a coating which is resistant to attack by products resulting from the combustion of fuels, and especially those containing lead compounds. The invention also includes corrosion- and/or decomposition-resistant metal articles, such as the above-mentioned engine valves, which are coated with the above-mentioned aluminum alloys.

It is well known that motor fuels, particularly gasoline, which are to be used as fuel in internal combustion engines frequently contain minor but effective amounts of anti-knock compounds, such as tetraethyl lead, as well as of certain halogenated compounds. Since the tetraethyl lead is at least in part decomposed during fuel combustion, the products of such combustion contain lead compounds which attack the valves of the engine. For instance, when standard-type valves are employed in aircraft engine cylinders, the face of the exhaust valve, i. e., the portion of the valve head exposed to the combustion chamber, is attacked by the products of combustion, particularly when the gasoline employed in such aviation engines contains tetraethyl lead. The metal on this part of the valve becomes removed or eaten away, leaving a sharp edge on the hard metal used for the valve seat. This weakens the valve to such a degree as to result in valve failures. Also, the sharp edge frequently induces pre-ignition.

It is one of the objects of the present invention to provide valves, particularly valves for internal combustion engines, which have thereon a substantial rigidly-attached coating resistant to attack by products of combustion of fuels, especially those containing lead compounds produced during the combustion of fuels, e. g. gasoline containing tetraethyl lead and the like. Another object of the invention is to provide an efficient and economical process for coating engine valves and the like with a substance or metallic surface which is resistant to the aforementioned attack by products of combustion.

Many other metallic articles are also used in places where they are exposed to high temperatures and to the influence of corrosive gases such as air or oxygen-containing gases, as well as the combustion products of various fuels. These articles, and particularly those of a ferrous or cuprous nature, i. e. made of or having a surface consisting of or containing iron and/or copper, when exposed to such corrosive gases at relatively high temperatures, will corrode very rapidly so that their useful life is generally relatively short. For example, ordinary carbon steel when exposed in conventional gas furnaces at temperatures of between about 800° C. and about 1200° C. will become badly corroded and scale in a few hours. In order to obviate such heat corrosion, the metallic materials have heretofore been subjected to various treatments to render them substantially resistant. All such processes, however, have been either difficult or uneconomical, and usually necessitate the employment of complicated procedures wherein the metallic materials are subjected to a number of treatments or steps. It is, therefore, a still further object of the present invention to provide a simple, efficient and economical process whereby various metallic materials or articles, particularly those of a ferrous and/or cuprous nature, may be readily and effectively rendered substantially resistant to heat corrosion. Another object is to provide a simple process for coating various metallic articles, such as metal sheets, strips, wire, tubes, pipes, and the like, consisting of or containing copper, nickel, iron, steel or alloys thereof, with a metallic material which is resistant to the aforementioned heat corrosion.

The resistance of a given metal surface to attack by lead compounds, particularly by lead oxides, depends on a number of factors. Above a certain temperature, which depends at least in part on the melting point of the particular lead compounds, the ability of a metallic surface to resist attack is a function of (1) the density of the protective oxide film which is normally present on the surface of all metals except the so-called noble metals, and (2) the stability of such protective oxide when in contact with a specific lead compound. The various metals, metallic alloys, and intermetallic compositions, all of which form protective oxide films which are resistant to scaling when subjected to high temperatures, may or may not be resistant to lead compound attack, particularly when contact is effected at said elevated temperatures. This resistance to attack by the lead compounds is dependent on the tendency of oxide film to react with the lead compounds, e. g. lead oxide. If the conditions are such that there occurs a reaction between the oxide film and the aforementioned lead compounds, the majority of heat-resisting steels and the other heat-resisting alloys (although they are resistant to ordinary corrosion by air and/or oxygen-containing gases at ordinary temperatures) will nevertheless be rapidly attacked by the various lead compounds such as lead oxide or mixtures containing lead oxide or other oxidized or oxygenated compounds such as those present in the products of combustion of motor fuels containing tetraethyl lead.

It has now been found that alloys containing aluminum and nickel, either alone, or together with other constituents as indicated hereafter, can be bonded more intimately to the metal which it is desired to protect and applied with greater uniformity by the following sequence of operation:

1. Application of a thin coating of nickel on the metal to be protected.
2. Protecting the nickel-coated article against oxidation.
3. Immersing the protected article in a bath of molten aluminum, or of an aluminum alloy, while moving the article at a high speed and passing an electric current through the article.
4. Heat treating the coated article, preferably while passing an electric current through it.

While it was found that best results are obtained by employing all of the foregoing steps, good results are also attainable by omitting certain features, as will become apparent from the following detailed description.

Figure 2:
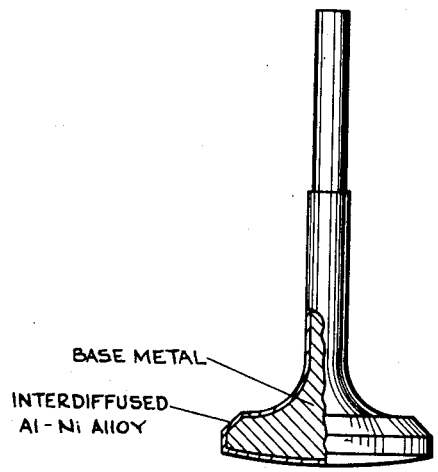

The invention is illustrated in the accompanying drawing, wherein:

Figure 1 is a process flow chart indicating the steps of the process, including optional steps, preferred conditions being indicated within the dashed rectangles; and Figure 2 is an elevation view of a coated valve according to the invention, parts being shown in section and the coating being enlarged out of scale for clarity.

The nickel coating may be applied to the metal in any known manner. I prefer to apply it by etching technique, using sulfuric acid as the etching medium, and depositing the nickel electrolytically. Preferably the nickel deposit is controlled to give a skin thickness between 0.004 and 0.005 inch, it having been found that the control of the thickness within this range leads to the formation of surface coatings, for example for engine valves, having optimum properties of resistance to corrosive attack by combustion product of leaded fuels. Good results are, however, obtained also outside of this optimum range, e. g., between 0.001 and 0.015 inch.

The nickel-coated article is, in the second operation, protected so that oxidation of the nickel deposit on immersion in the molten aluminum in the third step is avoided or minimized. To this end the nickel deposit is covered with an extremely thin film of a low melting metal, such as cadmium which, by reason of its comparatively low melting point, is subsequently removed from the nickel in the aluminum bath, leaving a clean surface on which the aluminum or aluminum alloy can be deposited. The coating of cadmium is preferably made as thin as possible compatible with a sound envelope and may be applied by electrolytic deposition. Alternatively, other means for protecting the nickel deposit against oxidation upon immersion in molten aluminum may be used; for example, a high temperature grease which can be vaporized or burned off without leaving a carbon deposit may be applied and, by way of illustration in this connection, the use of a silicone grease may be mentioned. The protective coat, regardless of composition, is applied immediately after nickel plating.

In the third step the nickel-coated article, preferably protected as described above, is immersed in a molten metal consisting predominantly of aluminum, i. e., consisting entirely of aluminum or containing an alloy containing over 60% of aluminum, together with nickel, cobalt and/or iron. An important feature of this invention resides in the manner of applying the molten aluminum to the metal article, and this method is useful also in the treatment of other articles which have not been previously plated with nickel and/or protected against oxidation, and wherein the molten metal contains less, e. g., only 35% aluminum. According to the preferred method of applying the molten metal, the article is moved rapidly in the molten bath while passing an electric current through it. For example, in the coating of engine valves, the valves are rotated at high and fairly uniform speed. The thickness of the aluminum or aluminum alloy coating on the valve surface is capable of control by regulating the speed of rotation of the valve. It appears that above a certain speed the coating tends to become rather thin, regardless of the time of immersion, while, on the other hand, there is a minimum speed of rotation, which is of the order of 100 revolutions per minute in the case of valves of the usual sizes, below which the coating obtained is somewhat uneven. By way of example, it may be stated that speeds of 300 revolutions per minute have been found to give excellent results in the case of valves having a head diameter of approximately 1¾ inches diameter; valves with smaller heads could be subjected to somewhat higher rates of rotation, e. g., 750-1500 revolutions per minute, while valves with larger heads are preferably rotated somewhat more slowly. A small electric current, e. g., one with a current density of 1 to 2 amperes per square inch of valve surface and with a voltage of about 4 volts, is passed from the valve to the bath during this operation, e. g., for about 15 to 60 seconds. The use of an electric current is efficacious whether the valve is made anodic or cathodic and also whether direct current or alternating current is employed, although I prefer the use of direct current, wherein the valve is made cathodic to the molten metal. The mechanism involved in securing advantage with the aid of a small electric current passing through the valve has not been elucidated, but it may be that this use of a small current assists in the formation of a satisfactory uniform coating properly bonded to the base metal by inhibiting any tendency towards oxidation of the valve surface under treatment.

The amounts of aluminum deposited on the article is so controlled, taking into account the nickel deposited in the first step and the nickel, if any, in the molten bath, that the resulting coat contains between 30 and 45% by weight of nickel, and between 55% and 70% aluminum. Preferably the coating should contain at least 62% aluminum and between 30 and 33% of nickel.

It appears that alloy formation, or something akin to alloy formation, is actively inititated during the course of aluminum deposition when conducted in the foregoing manner, thereby leading to the surface deposits which are adapted to resist attack by the combustion products of leaded fuels even without subsequent heat treatment. A process of inter-diffusion of the metals seems to be promoted as a result of the treatment and where a steel valve is under treatment this inter-diffusion process tends to the formation of a surface wherein the nickel-aluminum or nickel-cobalt-aluminum impregnates the outermost skin of parent metal thereby imparting to the said surface some of the attributes of an iron-nickel-aluminum alloy.

Dependent upon the duration and other conditions of treatment this promotion of metal diffusion in the course of applying aluminum to the nickel deposit can in varying degrees render unnecessary any subsequent operation designed to achieve intimate inter-diffusion of the metals, but, on the other hand, where the most intimate bonding of aluminum and nickel to the parent metal is desired, it may still be found advantageous to effect the subsequent heat treatment designed to continue and enhance the inter-diffusion process begun with the aid of an electric current passing through the rotating valve in the bath of molten aluminum.

Interdiffusion of metals by heat treatment is already known per se. It involves maintaining the coated article at a temperature of the order of 900° to 1000° C., e. g., in a salt bath. It has now been found that in such heat treatment diffusion is facilitated by the application of an electric current either direct or alternating, and that proceeding in this way diffusion can be effected at somewhat lower temperatures, for instance between 600 and 700° C. By way of example, a current of the intensity previously described for the third step of the process may be used, and the valve is preferably immersed in a salt bath, although baths other than salt, e. g., sodium cyanide or sodium cyanide-sodium carbonate baths, may be employed to advantage in conjunction with the foregoing technique.

It should be understood that the surface of the coating resulting from the heat diffusion treatment is not generally of a texture which renders the valve best adapted for the duty it is designed to perform, and that surface finishing, as by grinding and polishing, is usually necessary.

Valves fabricated from ferrous and non-ferrous metals may be treated by the aforesaid technique, for example, valves made of austenitic steel, stainless steel, silicon-chromium heat resisting steels, or Stellite steels.

In cases where the metal article is to be coated with aluminum immediately after cleaning and coating with nickel, the initial application of a low melting metal such as cadmium may be omitted. Also, the thin nickel coating in the first step need not be pure nickel, but may contain minor amounts of other metals, e. g., cobalt or aluminum. Matter relating to aluminum alloys disclosed herein is claimed in copending application Serial No. 2,141, filed January 13, 1948.

I claim as my invention:

1. A coated metal article having on at least a portion thereof a protective coating containing at least 55% aluminum and between 30 and 45% nickel, said coating being formed and intimately bonded to the base metal by interdiffusing an outer metal layer consisting predominantly of aluminum with a thin, intermediate layer consisting predominantly of nickel by passing an electric current therethrough.

2. A coated engine valve comprising a body made essentially of steel and having a protective coating at least on that part which is exposed to attack by the products of combustion of engine fuel, said coating containing at least 55% aluminum and between 30 and 45% nickel and being formed and intimately bonded to the steel by interdiffusing an outer metal layer consisting predominantly of aluminum with a thin, intermediate layer consisting predominantly of nickel by passing an electric current therethrough at a temperature above about 600° C.

3. The valve according to claim 2 wherein the interdiffusion is effected at least partially while the valve is immersed in a molten bath containing at least 60% aluminum.

4. A process for rendering ferrous valves for internal combustion engines resistant to attack by lead compounds comprising the steps of applying to a valve a coating of nickel between about 0.001 and 0.015 inch in thickness, immersing the nickel-coated valve in a molten bath containing at least 60% aluminum and building up on the valve a coating of aluminum while rotating the valve and passing a weak electric current through the valve and molten metal bath, said weak current being insufficient to maintain the bath molten, and withdrawing the valve from the bath.

5. In combination with the steps of claim 4, the step of subjecting the coated valve to a further treatment for interdiffusing and alloying the metal to the underlying metal by subjecting it to a temperature above about 600° C. while passing a weak electric current through the valve said weak current being insufficient to maintain the valve at the said temperature.

6. A process for rendering ferrous valves for internal combustion engines resistant to attack by lead compounds comprising the steps of applying to a valve a coating of nickel between about 0.001 and 0.015 inch in thickness, promptly thereafter applying to the valve a thin skin of a low melting material for excluding oxygen from the nickel coating, immersing the protective-coated valve in a molten metal bath containing at least 60% aluminum and building up on the valve a coating of aluminum while rotating the valve and passing an electric current through the valve and molten metal bath, and withdrawing the coated valve from the bath.

7. A process for rendering ferrous valves for internal combustion engines resistant to attack by lead compounds comprising the steps of applying to said valves a coating of nickel between about 0.004 and 0.005 inch in thickness, promptly thereafter applying to the valve a thin skin of a low melting material for excluding oxygen from the nickel coating, immersing the protective-coated valve in a molten metal bath containing at least 60% aluminum while rotating the valve and passing an electric current through the valve and molten metal bath, thereby applying a coating of aluminum to the valve, withdrawing the coated valve from the bath, and subjecting the valve to a temperature above about 600° C. while passing an electric current through the valve to effect interdiffusion of the metals and effect the alloying of the coatings with the underlying iron.

8. The process according to claim 7 wherein the aluminum layer is applied in such amount that the resultant coating contains between 30 and 45% by weight of nickel and between 55% and 70% aluminum.

9. The process according to claim 7 wherein the protective coating comprises a low melting metal.

10. The process according to claim 9 wherein the protective coating is cadmium.

11. A process for rendering ferrous valves for internal combustion engines resistant to attack by lead compounds comprising the steps of applying to said valve a thin coating consisting predominantly of nickel, immersing the nickel-coated valve in a molten bath containing at least 60% aluminum and building up on the valve a coating of aluminum while passing an electric current through the valve and molten metal bath, thereby causing the interdiffusion of the nickel and the aluminum and the alloying of the nickel and aluminum to the underlying metal, and withdrawing the coated valve from the molten metal bath.

12. The process according to claim 11 wherein the coated valve, after withdrawal from the molten metal bath, is subjected to a further treatment for interdiffusion and alloying of the metal to the underlying metal by subjecting it to a temperature above about 600° C. while passing an electric current through the valve.

13. The process according to claim 12 wherein the further treatment of the valve is effected in a molten, non-metallic bath and the temperature is not above about 700° C.

14. A process for applying a protective coating containing aluminum to a valve for internal combustion engines comprising the steps of immersing said valve in a molten metal bath containing at least 35% aluminum, contacting a metallurgically clean surface of said valve with the molten metal in said bath and building up on the valve a coating of aluminum while passing an electric current through said valve and molten metal bath to effect interdiffusion of the metal in said coat with the underlying metal, and withdrawing the coated valve from the molten metal bath.

15. A process for applying a protective coating containing aluminum to a valve for internal combustion engines comprising the steps of immersing said valve in a molten metal bath containing at least 35% aluminum, contacting a metallurgically clean surface of said valve with the molten metal in said bath and building up on the valve a coating of aluminum while rotating the valve at a speed between about 100 and 1500 revolutions per minute and passing a weak electric current through the valve to effect interdiffusion of the metal in said coat with the underlying metal, said weak current being insufficient to maintain the bath molten, and withdrawing the coated valve from the molten metal bath.

16. A process for applying a protective coating containing aluminum to a valve for internal combustion engines comprising the steps of covering a metallurgically clean surface of said valve with a thin skin of a low melting material for excluding oxygen from said surface, immersing said covered valve in a molten metal bath containing at least 35% aluminum to melt said low melting material and thereby contact a metallurgically clean surface of the valve with the molten metal in said bath and building up on the valve a coating of aluminum while passing an electric current through said valve and molten metal to effect interdiffusion of the metal in said coat with the underlying metal, and withdrawing the coated valve from the molten metal bath.

17. The process according to claim 15 wherein the low melting material is a metal.

18. In the process of protecting ferrous metal articles by applying thereto a coating of an alloy containing at least 35% aluminum, the step of effecting interdiffusion of the metal alloy of the coating with the ferrous metal of the article by subjecting the article, after the application of said aluminum alloy coating thereto, in a molten, non-metallic bath to a temperature above about 600° C. but below 900° C. while passing an electric current through the molten bath and the article.

19. The process according to claim 18 wherein the interdiffusion treatment is effected at a temperature not above about 700° C.

20. The process according to claim 19 wherein the alloy contains at least 30% nickel.

ROBERT GRAHAM.

References Cited in the file of this patent

UNITED STATES PATENTS

| Number | Name | Date |
|---|---|---|
| Re. 12,779 | Goodson | Apr. 14, 1908 |
| 1,637,033 | Basch | July 26, 1927 |
| 1,731,202 | Phillips | Oct. 8, 1929 |
| 2,216,519 | Quarnstrom | Oct. 1, 1940 |
| 2,273,250 | Charlton | Feb. 17, 1942 |
| 2,294,803 | Rich | Sept. 1, 1942 |
| 2,405,222 | Mann | Aug. 6, 1946 |

FOREIGN PATENTS

| Number | Country | Date |
|---|---|---|
| 230,096 | Great Britain | Aug. 27, 1925 |
| 428,855 | Great Britain | May 21, 1935 |